(12) United States Patent
Miyamoto et al.

(10) Patent No.: US 7,850,930 B2
(45) Date of Patent: Dec. 14, 2010

(54) MICROREACTOR

(75) Inventors: Tetsuo Miyamoto, Kasumigaura (JP); Hajime Kato, Tsuchiura (JP); Shigenori Togashi, Abiko (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 629 days.

(21) Appl. No.: 11/835,439

(22) Filed: Aug. 8, 2007

(65) Prior Publication Data

US 2008/0085227 A1    Apr. 10, 2008

(30) Foreign Application Priority Data

Oct. 6, 2006    (JP)    ............................ 2006-274578

(51) Int. Cl.
*B01J 19/00* (2006.01)
(52) U.S. Cl. .................... 422/224; 422/100; 366/165.1; 366/167.1
(58) Field of Classification Search ................ 422/100, 422/130, 131, 129, 224, 215; 366/167.1, 366/165.1
See application file for complete search history.

(56) References Cited

U.S. PATENT DOCUMENTS

| | | | |
|---|---|---|---|
| 5,842,787 A | 12/1998 | Kopf-Sill et al. | |
| 6,863,867 B2* | 3/2005 | Vanden Bussche et al. | 422/129 |
| 6,935,768 B2* | 8/2005 | Lowe et al. | 366/167.1 |
| 6,982,064 B1* | 1/2006 | Ehrfeld et al. | 422/130 |
| 7,097,347 B2* | 8/2006 | Vanden Bussche et al. | 366/165.1 |
| 7,241,423 B2* | 7/2007 | Golbig et al. | 422/130 |
| 2004/0109793 A1* | 6/2004 | McNeely et al. | 422/100 |

(Continued)

FOREIGN PATENT DOCUMENTS

DE    202 06 371    6/2002

(Continued)

OTHER PUBLICATIONS

Norbert Schwesinger et al., A Modular Microfluid System with an Integrated Micromixer, Journal of Micromechanics & Microengineering, Institute of Physics Publishing, vol. 6, No. 1, Mar. 1996, pp. 99-102, XP020069037.

(Continued)

*Primary Examiner*—N. Bhat
(74) *Attorney, Agent, or Firm*—Antonelli, Terry, Stout & Kraus, LLP.

(57) ABSTRACT

The microreactor for mixing and discharging multiple raw material liquids is obtained by laminating: a base plate in which a raw material introducing fluid channel is formed; a raw material introducing plate; and a mixing fluid channel plate which is arranged between the base plate and the raw material introducing plate, and in which a mixing fluid channel is formed. The microreactor includes: a mixing fluid channel in the mixing fluid channel plate which is formed in the mixing fluid channel plate, and in which a flow is contracted in its width direction; and a mixing fluid channel in the base plate which is formed in the base plate, and which has a fluid channel cross-section which becomes larger in its depth direction as it goes downstream. The mixing fluid channel in the base plate communicates with the mixing fluid channel in the mixing fluid channel plate, and is connected to an outlet orifice from which to discharge the mixed liquids.

17 Claims, 10 Drawing Sheets

U.S. PATENT DOCUMENTS

2004/0125689 A1* 7/2004 Ehrfeld et al. ........... 366/165.1
2005/0161326 A1   7/2005 Morita et al.

FOREIGN PATENT DOCUMENTS

| EP | 1 623 760   | 2/2006 |
| JP | 2003-047839 | 2/2003 |
| JP | 2005-083505 | 3/2005 |
| JP | 2006-102649 | 4/2006 |
| JP | 2006-102681 | 4/2006 |

OTHER PUBLICATIONS

European Search Report of Appln. 07015620.3 in English.
JP Office Action of Appln. No. 2006-274578 dated Oct. 5, 2010.

* cited by examiner

MICROREACTOR

CLAIM OF PRIORITY

The present application claims priority from Japanese application JP2006-274578 filed on Oct. 6, 2006, the content of which is hereby incorporated by reference into this application.

BACKGROUND OF THE INVENTION

1. Field of the Invention

The present invention relates to a microreactor for mixing fluids including liquids and gases, and for causing the fluids to undergo chemical reaction, in a fine-scaled confinement with typical lateral dimensions below 1 mm with high efficiency.

2. Description of Related Art

Recently, fluid mixers of a type which is configured of fluid channels each with a length of tens to hundreds micrometers, and which is manufactured by use of nanometer process technology, have begun to be used in the field of chemical synthesis and analysis for the purpose of shortening time needed for mixture or chemical reaction, or for the purpose of checking secondary reaction. Fluid mixers of this kind are termed as micromixers or microreactors. In the case of micromixers, a representative length of fluid channels is short so that the Reynolds number, which is a dimensionless number, and which represents a ratio of an inertia force to a viscous force of a fluid, is accordingly small. For this reason, the flow of the fluid is a laminar flow. As a result, in a case where multiple fluids are mixed together, the mixture progresses chiefly through molecular diffusion.

On the basis of this, the shorter the representative length of fluid channels is made, the shorter the diffusion distance becomes, and the faster mixture can be realized. In addition, its miniaturization increases the surface area of each fluid channel per volume, and accordingly increases a rate of heat transferred to the fluid in the channel. This makes it possible to accurately control the temperature of a reactant liquid, and to thus increase the efficiency of a chemical reaction in a case where the chemical reaction accompanying heat of reaction is performed by the microreactor.

In addition, it has been known that, for the purpose of stabilizing chemical reaction irrespective of the varying velocity and flow rate of a fluid, a microchannel serving as a fluid channel through which the fluid flows is provided with multiple microheaters in the same direction as the fluid flows to make the chemical reaction progress under heat control. This has been described, for example, in Japanese Patent Application Laid-open Publication No. 2003-47839 (hereinafter referred to as a "Patent Document 1").

Besides, it has been known that, for the purpose of reducing pressure loss, multiple nozzles for one of two different liquids and multiple nozzles for the other of the two liquids are arranged in an alternate sequence so that a laminar flow in which the two liquids flow alternately is created. This has been described, for example, in Japanese Patent Application Laid-open Publication No. 2006-102681 (hereinafter referred to as a "Patent Document 2").

SUMMARY OF THE INVENTION

In the case of the prior art, the microreactor described in Patent Document 1 does nothing but controlling the length of the heating area for chemical reaction, and accordingly gives no consideration to pressure loss which takes place due to resistance from the surface of a fluid channel. As a result, it is difficult to increase the flow rate, and to flow a highly viscous liquid in this microreactor.

In addition, the microreactor described in Patent Document 2 needs to have a contraction flow section in its downstream part for the purpose of forming a laminar flow. However, mere contraction flow tends to increase the flow velocity and the resultant pressure loss. Moreover, in a case where two liquids which are different from each other in flow rate and viscosity are flowed there, the diameters of the nozzles arranged in an alternate sequence have to be changed depending on the flow rates and viscosities of the two liquids.

An object of the present invention is to solve the foregoing problems with the prior art, and to accordingly obtain a microreactor capable of dealing with fluids even though the fluids are each large in amount or high in viscosity viscous, even though the fluids are of different types, or even though the fluids are different from each other in flow rate and viscosity.

For the purpose of achieving the object, a first aspect of the present invention is a microreactor for mixing and discharging multiple raw material liquids, the microreactor obtained by laminating a base plate, a raw material introducing plate and a mixing fluid channel plate. In the base plate, a raw material introducing fluid channel for introducing one of the multiple raw material liquids is formed. In the raw material introducing plate, a raw material introducing fluid channel for introducing the other of the multiple raw material liquids is formed. In the mixing fluid channel plate, arranged between the base plate and the raw material introducing plate, a mixing fluid channel for mixing the raw material liquids is formed. The microreactor includes: the mixing fluid channel plate's mixing fluid channel which is formed in the mixing fluid channel plate, and in which a flow is contracted in its width direction; and the base plate's mixing fluid channel which is formed in the base plate, and whose cross-section becomes larger in its depth direction as it goes downstream. The base plate's mixing fluid channel communicates with the mixing fluid channel plate's mixing fluid channel, and is connected to an outlet orifice from which to discharge the mixed liquids.

In addition, another aspect of the present invention is a microreactor for mixing and discharging multiple raw material liquids, obtained by laminating raw material introducing plates and mixing fluid channel plates. In each of the raw material introducing plates, a raw material introducing fluid channel for introducing a corresponding one of the raw material liquids is formed. In each of the mixing fluid channel plates, arranged between corresponding two of the raw material introducing plates, a mixing fluid channel plate for mixing the raw material liquids is formed. In the microreactor, multiple sets each obtained by laminating two of the raw material introducing plates and one of the mixing fluid channel plates are superimposed one on another with another of the mixing fluid channel plates interposed between each neighboring sets, the mixing fluid channel plate being arranged between the two raw material introducing plates, a mixing fluid channel in the mixing fluid channel plate being formed in the mixing fluid channel plate, and a flow being contracted in a width direction in the mixing fluid channel. In addition, a base plate is arranged at the bottom of the superimposed multiple sets, the base plate including a mixing fluid channel in the base plate, the mixing fluid channel in the base plate communicating with the mixing fluid channel in each of the neighboring mixing fluid channel plates, and the mixing fluid channel in the base plate having a cross-section which becomes larger in its depth direction as it goes downstream.

The present invention makes it possible to contract a laminar mixed flow, and to concurrently check increase in pressure loss which would otherwise take place due to the contraction flow, because the mixing fluid channel has a fluid channel cross-section which becomes larger in its depth direction as it goes downstream. Consequently, this makes it easier for the microreactor to deal with fluids even though the fluids are each large in amount or high in viscosity, even though the fluids are of different types, or even though the fluids are different from each other in flow rate and viscosity.

DESCRIPTION OF THE PREFERRED EMBODIMENTS

Figure 1:
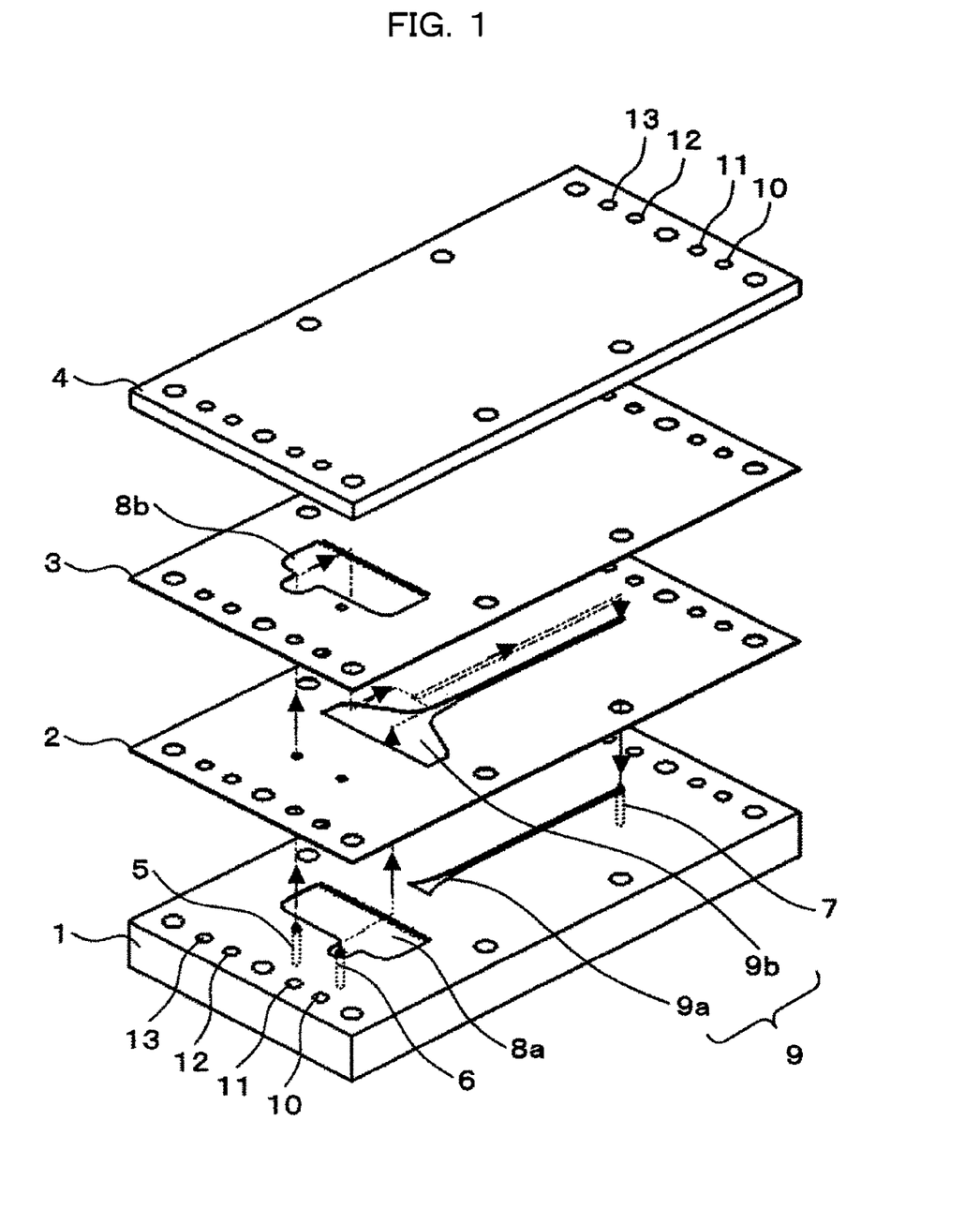
FIG. 1 is a perspective view showing a configuration of a microreactor according to an embodiment of the present invention.
Figure 2:
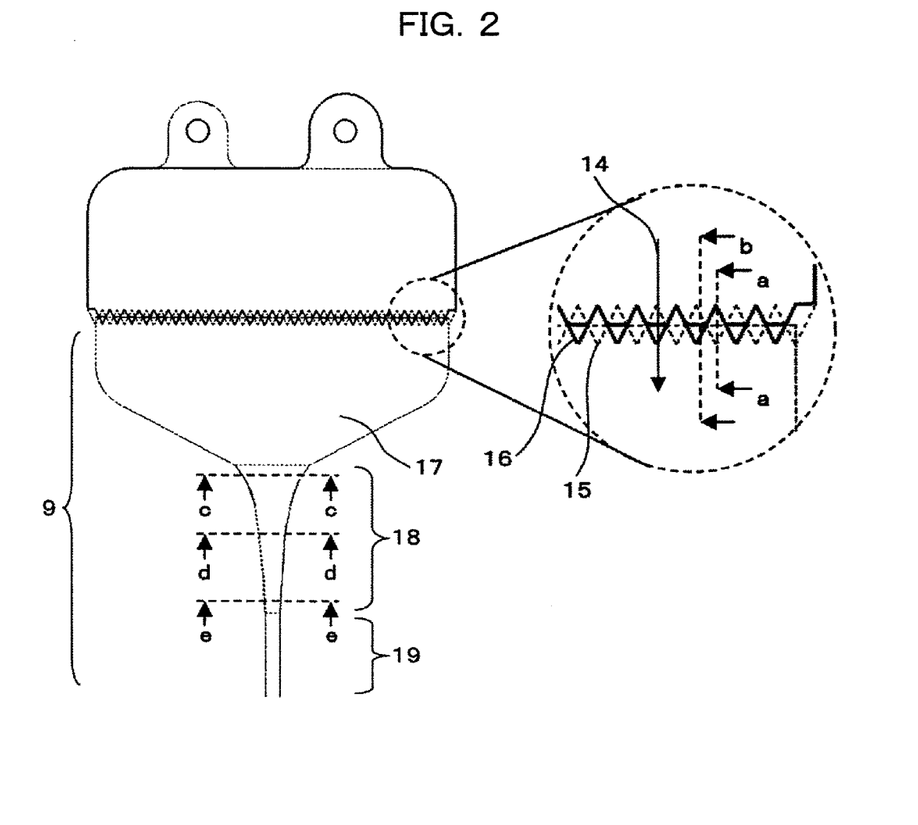
FIG. 2 is a partial plan view showing the configuration of the microreactor shown in FIG. 1.
Figure 3:
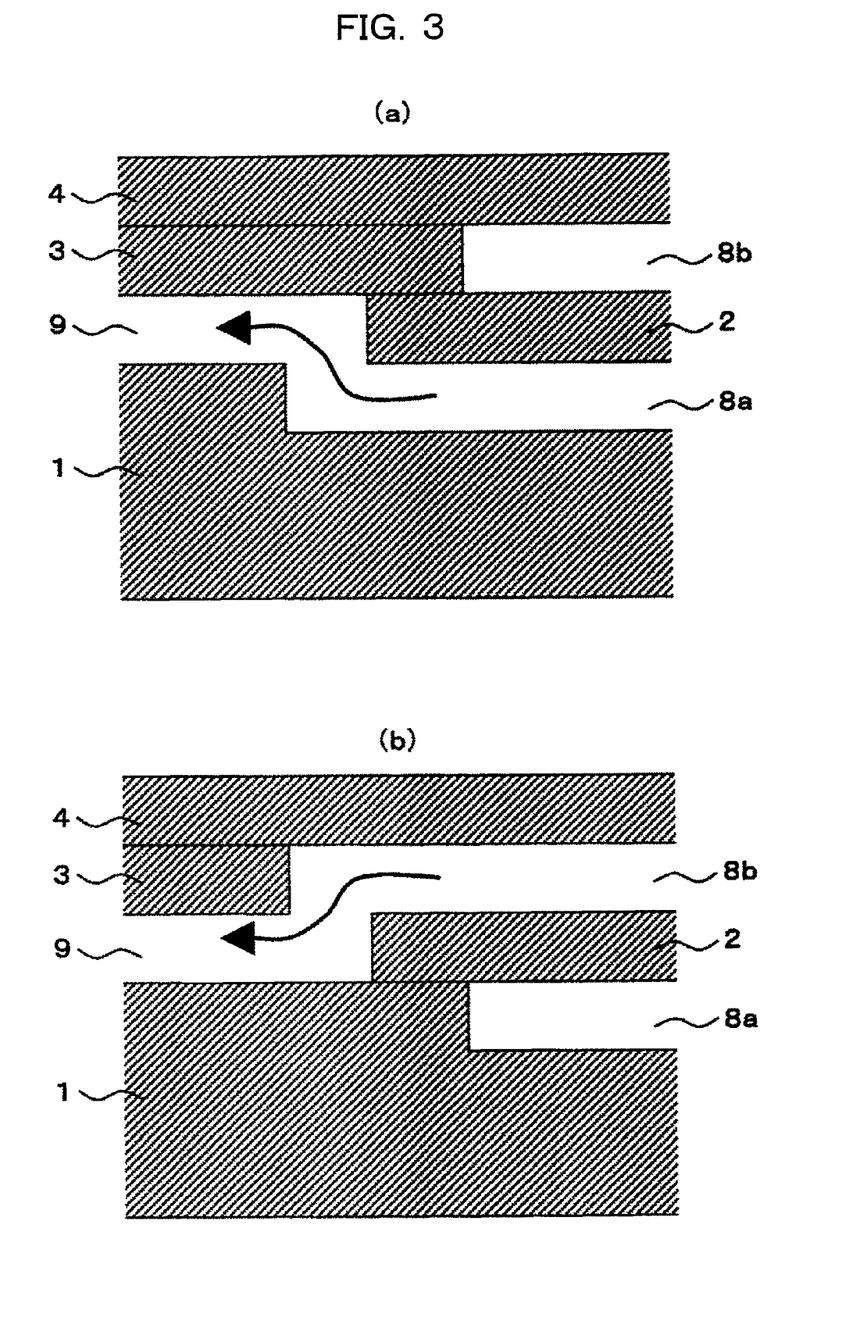
FIGS. 3A and 3B are cross-sectional views of the configuration shown in FIG. 2.

FIG. 1 is an exploded perspective view showing a configuration of a microreactor according to an embodiment. FIG. 2 is a partial plan view showing the configuration of the microreactor shown in FIG. 1, accompanied by a magnified view showing a part of the configuration. FIGS. 3A and 3B are cross-sectional views of a section where raw material introducing fluid channels and a mixing fluid channel each shown by the partial plan view of FIG. 2 overlap one another, the cross-sectional views being in parallel with a direction in which fluids flows. FIG. 3A is the cross-sectional view of the section taken along the a-a line of FIG. 2. FIG. 3B is the cross-sectional view of the section along the b-b line of FIG. 2. In addition, FIGS. 4C, 4D and 4E are cross-sectional views of a contraction section shown by the partial plan view of FIG. 2. FIG. 4C is the cross-sectional view of the contraction section taken along the c-c line of FIG. 2. FIG. 4D is the cross-sectional view of the contraction section taken along the d-d line of FIG. 2. FIG. 4E is a cross-sectional view of the contraction section taken along the e-e line of FIG. 2.

The microreactor has a configuration in which four plates 1 to 4 are laminated. A lowermost plate is a base plate 1, in which raw material liquid inlet orifices 5 and 6, a raw material liquid outlet orifice 7, a raw material introducing fluid channel 8a and the base plate's mixing fluid channel 9a are formed. The base plate's mixing fluid channel 9a includes: a contraction section which contract a flow in its width direction, and whose cross-section becomes deeper in its depth direction, as it goes downstream; and a mixing section whose a fluid channel cross-section is unchanged.

A second plate from the bottom is a mixing fluid channel plate 2, in which the mixing fluid channel plate's mixing fluid channel 9b is formed. The mixing fluid channel plate's mixing fluid channel 9b is that for mixing two raw material liquids together.

A third plate from the bottom is a raw material introducing plate 3, in which a raw material introducing fluid channel 8b is formed. The raw material introducing fluid channel 8b is that for introducing one of the two raw materials to the mixing fluid channel plate 2.

A fourth plate from the bottom is an upper lid 4.

In addition, each of the four plates has alignment holes 10 to 13 with which the four plates are aligned to one another. The alignment hole 10 is a hole located at a standard position, which will be described later. The alignment holes 10 to 13 are set in order that the positions of the base plate 1 and the raw material introducing plate 3 can shift back and forth from each other in a direction in which the fluids flow with different shifting distances.

Descriptions will be provided for a case where the four plates are aligned to one another with the standard alignment hole 10.

As shown in FIG. 2, a series of triangular fluid channel convex portions 15 and 16 are formed in their respective downstream ends of the raw material introducing fluid channels 8a and 8b. The base plate 1 and the raw material introducing plate 3 are formed in a way that the two plates are laminated while shifting the apices of the fluid channel convex portion 15 from the apices of the fluid channel convex portion 16 by a half pitch in the width direction. Moreover, the raw material introducing fluid channels 8a and 8b are aligned to the mixing fluid channel in a way that the front end of the mixing fluid channel is interposed between the upper end and the lower end of each of the fluid channel convex portions.

Once the two different fluids are introduced respectively to the raw material inlet orifices 5 and 6, a first one of the two fluids flows into the mixing fluid channel 9 in a direction indicated by an arrow 14 in FIG. 2 via the fluid channel convex portion 15 of the raw material introducing channel 8a, and a second one of the two fluids flows into the mixing fluid channel 9 in the direction indicated by the arrow 14 in FIG. 2 via the fluid channel convex portion 16 of the raw material introducing channel 8b.

In the cross-section a, the first fluid flows into the mixing fluid channel 9 from the raw material introducing channel 8a, but no second fluid flows into the mixing fluid channel 9 from the raw material introducing fluid channel 8b, as shown in FIG. 3A. On the other hand, in the cross-section b, the second fluid flows into the mixing fluid channel 9 from the raw material introducing fluid channel 8b, but no first fluid flows into the mixing fluid channel 9 from the raw material introducing fluid channel 8a, as shown in FIG. 3B. Consequently, the two fluids flow into the mixing fluid channel 9 alternately from the raw material introducing fluid channel 8a and 8b along the arrangement of the fluid channel convex portions 15 and 16 respectively at the ends of the raw material introducing fluid channels. Thereby, in the mixing fluid channel 9, the two different fluids form a laminar flow in which the two fluids are arranged alternately in the width direction.

Figure 4:
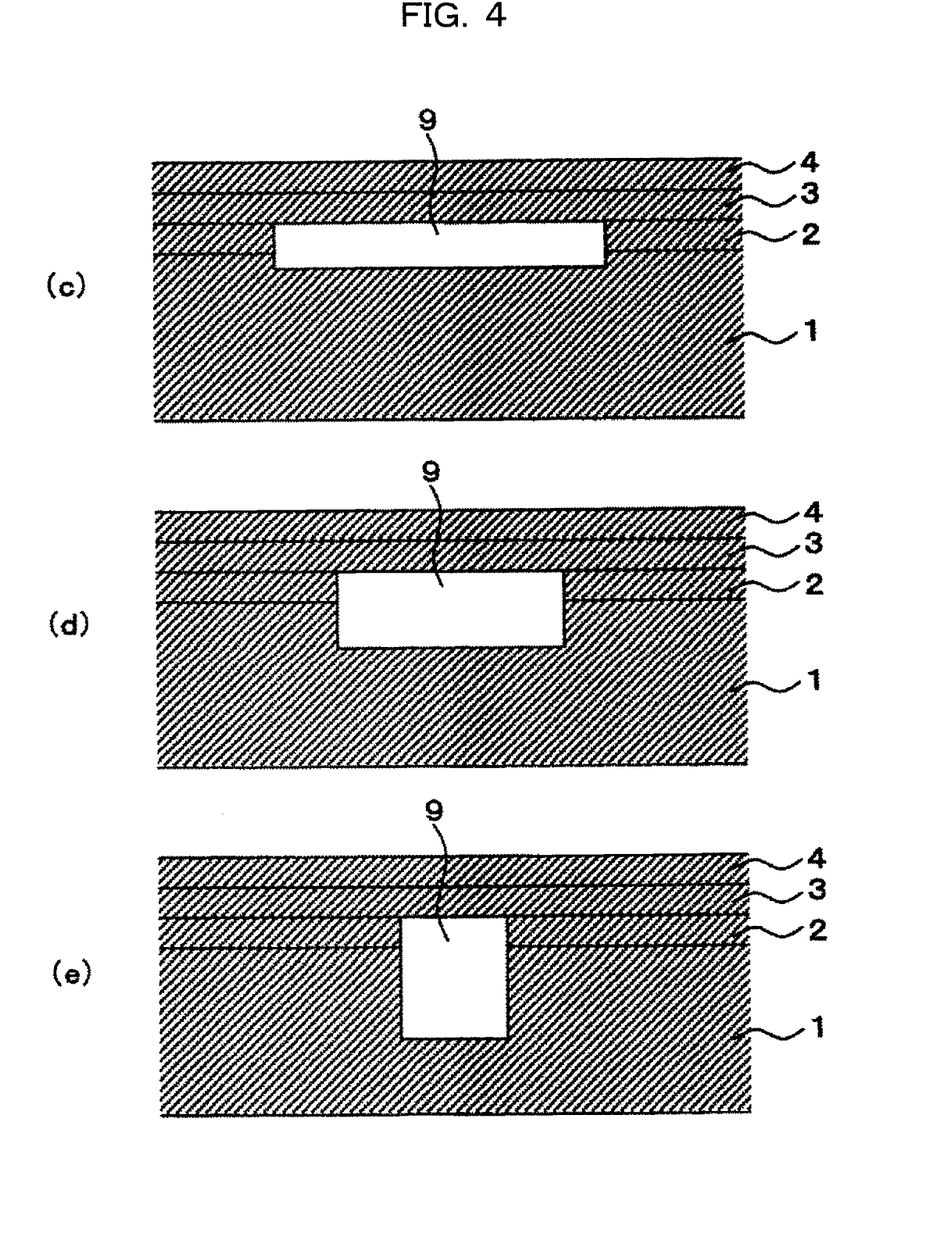
FIGS. 4C, 4E and 4D are other cross-sectional views of the configuration shown in FIG. 2.

In the mixing fluid channel 9, a contraction flow section 17 in the mixing fluid channel makes the flow narrower in its width direction as it goes downstream by contraction flow. Furthermore, in a contraction section 18 in the mixing fluid channel, the fluid channel becomes narrower as it goes downstream, in common with the contraction flow section 17. On the other hand, the fluid channel becomes deeper as it goes downstream due to the base plate's mixing fluid channel 9a whose cross-section of the fluid channel becomes larger in the depth direction as it goes downstream, as shown in FIG. 4. That is because the mixing fluid channel 9 as a whole is configured of the base plate's mixing fluid channel 9a formed in the base plate 1 and the mixing fluid channel plate's mixing fluid channel 9b formed in the mixing fluid channel plate 2. In a mixing section 19 in the mixing fluid channel following the contraction section 18, the cross-section of the fluid channel is unchanged. The foregoing structure makes it easier to process the mixing fluid channel 9, because only the depth of the base plate's mixing fluid channel 9a needs to be changed.

The mixing fluid channel's contraction section 18 reduces intervals between two neighboring laminar flows each configured of the two different fluids in the width direction, and thus decreases the diffusion distance, accordingly increases the mixing speed at which the two different fluids are mixed together due to the diffusion. In addition, the mixing fluid channel's contraction section 18 is designed to become deeper as it goes downstream. For this reason, the contraction section 18 is capable of holding the pressure loss of the fluid channel to a lower level with the progressively increasing depth and the contraction flow in its width direction than only with the contraction flow in its width direction. Furthermore, the contraction section 18 decreases the flow velocity because of the progressively increasing sectional area of the fluid channel. In a case where both the contraction flow width and the time to be spent for mixing by diffusion are unchanged, the length of the fluid channel needed for the mixture in the mixing fluid channel's mixing section 19 can be shortened with the decreased flow velocity than with the unchanged flow velocity. This makes it possible to reduce the pressure loss further.

It is desirable that the cross-section in the most downstream part of the mixing fluid channel's contraction section 18 should be more than twice as large in depth as the cross-section in the upstream part thereof, and that a ratio of the depth to the width of the fluid channel in the most downstream part thereof should be not smaller than 1:1. Moreover, it is desirable that the cross-sectional form of the contraction section should be changed with the sectional area of the contraction section remaining constant. This makes it possible to provide a microreactor making the pressure loss lower, and enables the microreactor to deal with object fluids larger in amount and higher in viscosity than a microreactor of a conventional type does.

Figure 5:
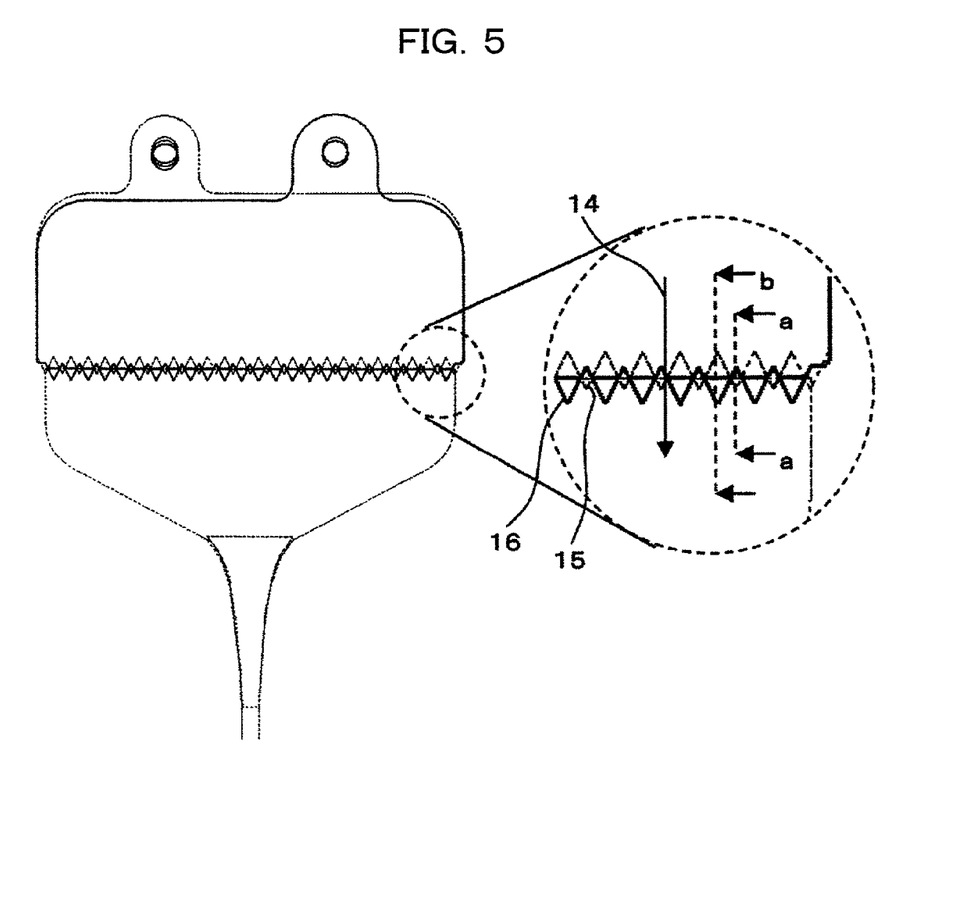
FIG. 5 is a partial plan view of a configuration of a microreactor which is obtained by changing laminating positions in the microreactor according to the embodiment.
Figure 6:
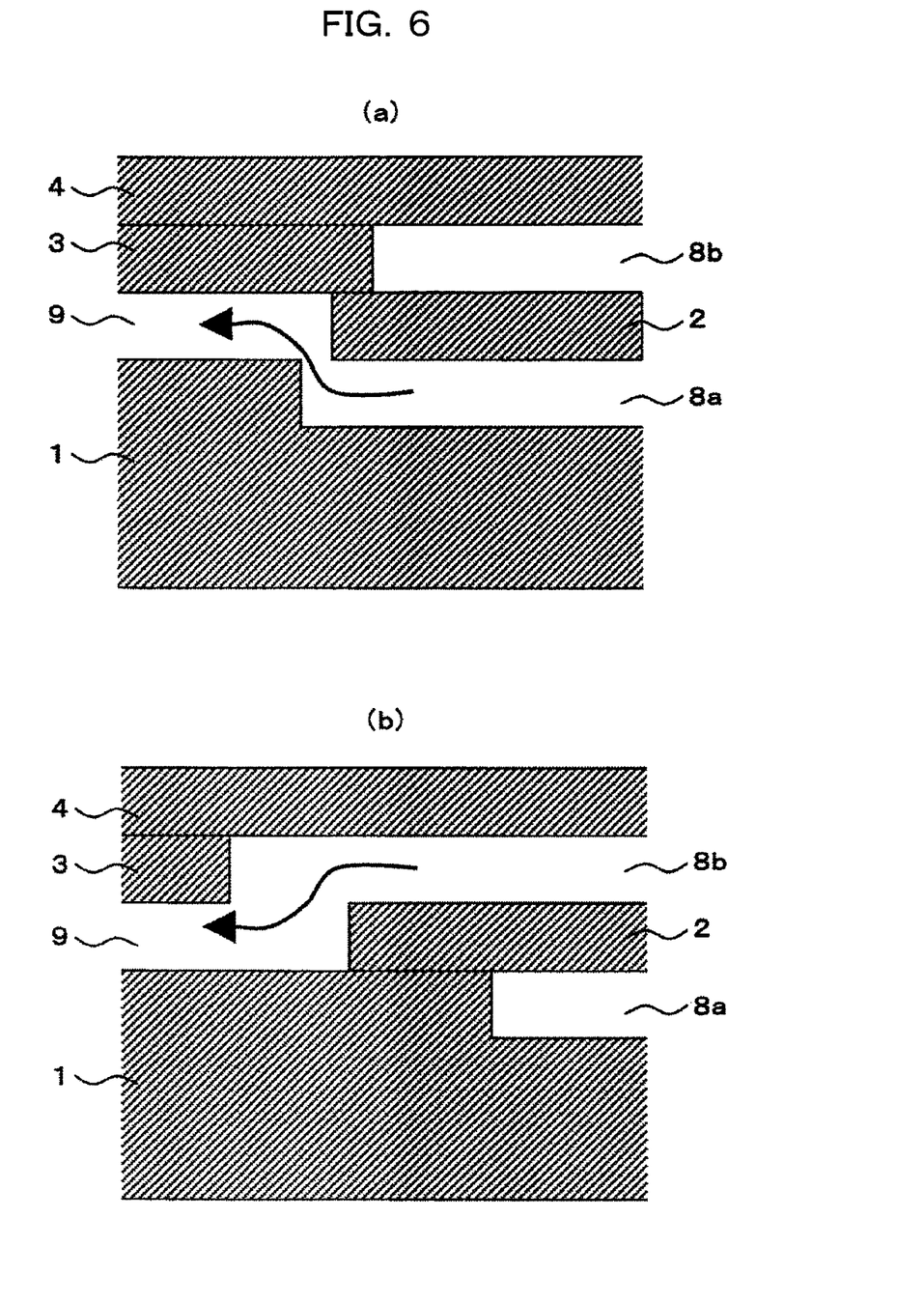
FIGS. 6A and 6B are cross-sectional views of the configuration shown in FIG. 5.

Descriptions will be provided for an example where the positions in which the respective plates are laminated are changed, by taking a case where the laminating position is set by use of the alignment hole 12. FIG. 5 is a partial plan view showing a configuration of a microreactor which is obtained when the positions in which the respective plates are laminated are changed, accompanied by a magnified view showing a part of the configuration. FIGS. 6A and 6B are cross-sectional views of a nozzle section shown in the partial plan view of FIG. 5, the cross-sectional views being in parallel with a direction in which the fluids flow. FIG. 6A is the cross-sectional view of the nozzle section taken along the a-a line of FIG. 5. FIG. 6B is the cross-sectional view of the nozzle section along the b-b line of FIG. 5.

In the case where the alignment hole 12 is used, the base plate 1 is moved from the position in which the base plate 1 is originally aligned to the mixing fluid channel plate 2 in the case shown in FIG. 2 in a direction opposite to a direction in which the fluids flow, whereas the raw material introducing plate 3 is moved from the position in which the raw material introducing plate 3 is originally aligned to the mixing fluid channel plate 2 in the case shown in FIG. 2 in the same direction as the fluids flow. As a result, the opening portion through which one of the fluids flows from the raw material introducing fluid channel 8a into the mixing fluid channel 9 is smaller in size, whereas the opening portion through which the other of the fluids flows from the raw material introducing fluid channel 8b into the mixing fluid channel 9 is larger in size.

In a case where the two different fluids are alternately introduced to the mixing fluid channel via multiple opening portions, the pressure of each of the opening portions for one of the two fluids is equal to the pressure of each of the opening portions for the other of the two fluids, or the pressures respectively of the starting points of the laminar flows are equal to each other. For this reason, the widths respectively of the two fluids in each laminar flow are uniquely determined depending on the flow rates and viscosities of the two fluids. If these widths are different from the widths of the opening portions to a large extent, however, this difference makes it difficult to form the laminar flows stably. In a case where, for instance, two fluids are different from each other in flow rate, the size of an opening in each section from which a fluid with a smaller flow rate is introduced has to be smaller than the size of an opening in each section from which a fluid with a larger flow rate is introduced.

In the case of the present example, the size of an opening in each section from which one of the two different fluids is introduced are capable of being controlled by selecting one of the alignment holes while changing neither designs nor processes. This makes it possible for the microreactor to flexibly deal with two different fluids in a combination of their respective flow rates and viscosities.

Figure 7:
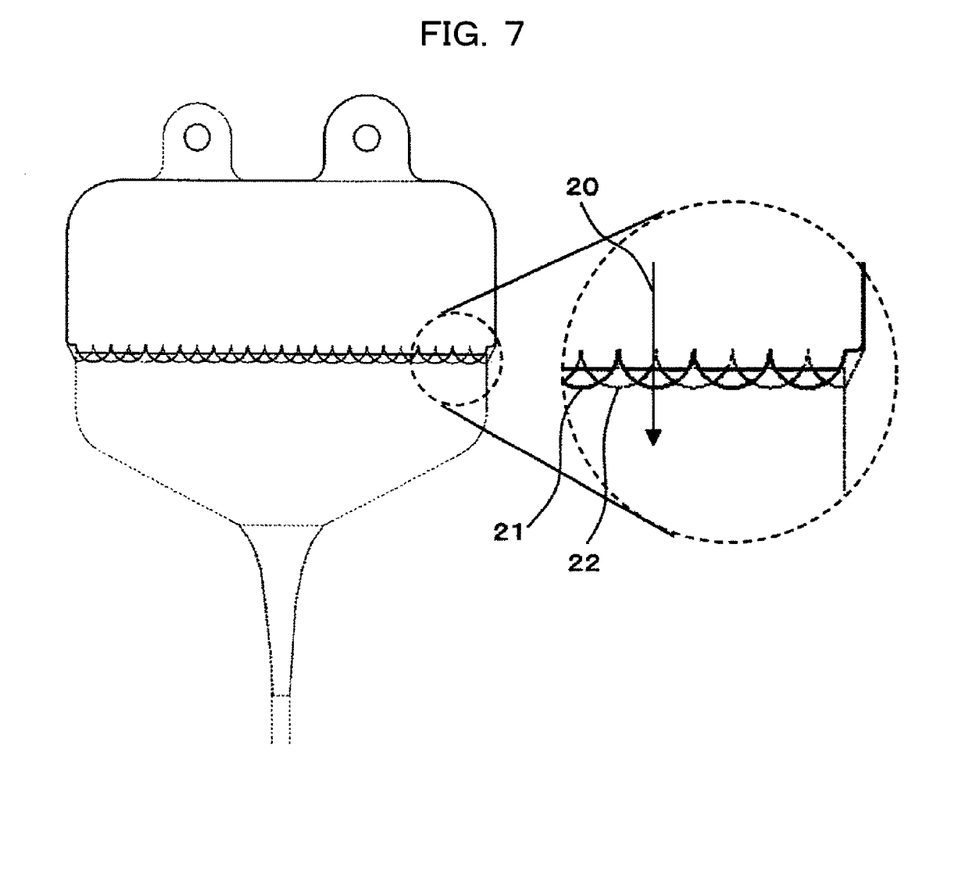
FIG. 7 is a partial plan view showing a microreactor according to another embodiment.

Another embodiment will be described by use of the drawings. A microreactor according to this embodiment is obtained by changing the shapes respective of the fluid channel convex portions in the downstream end of the corresponding raw material introducing fluid channels in the microreactor according to the embodiment described above. FIG. 7 is a partial plan view of laminated plates in the microreactor according to this embodiment, accompanied by a magnified view of a part of the laminated plates. The downstream ends of the raw material introducing fluid channels are provided respectively with a series of semi-circular fluid channel convex portions 21 and 22.

Two different fluids flow alternately into the mixing fluid channel from the respective raw material introducing fluid channels 8a and 8b in a direction indicated by an arrow 20. This forms laminar flows in the width direction. This makes it easier to process the raw material introducing fluid channels by use of a drill or the like. The downstream ends respectively of the raw material introducing fluid channels bring about a similar effect as long as the downstream ends are formed in an alternate series of concaves and convexes in the width direction. In a case where, however, the sizes of the openings are changed by changing the laminating position, it is desirable that the downstream ends should be tapered in the downstream direction.

Figure 8:
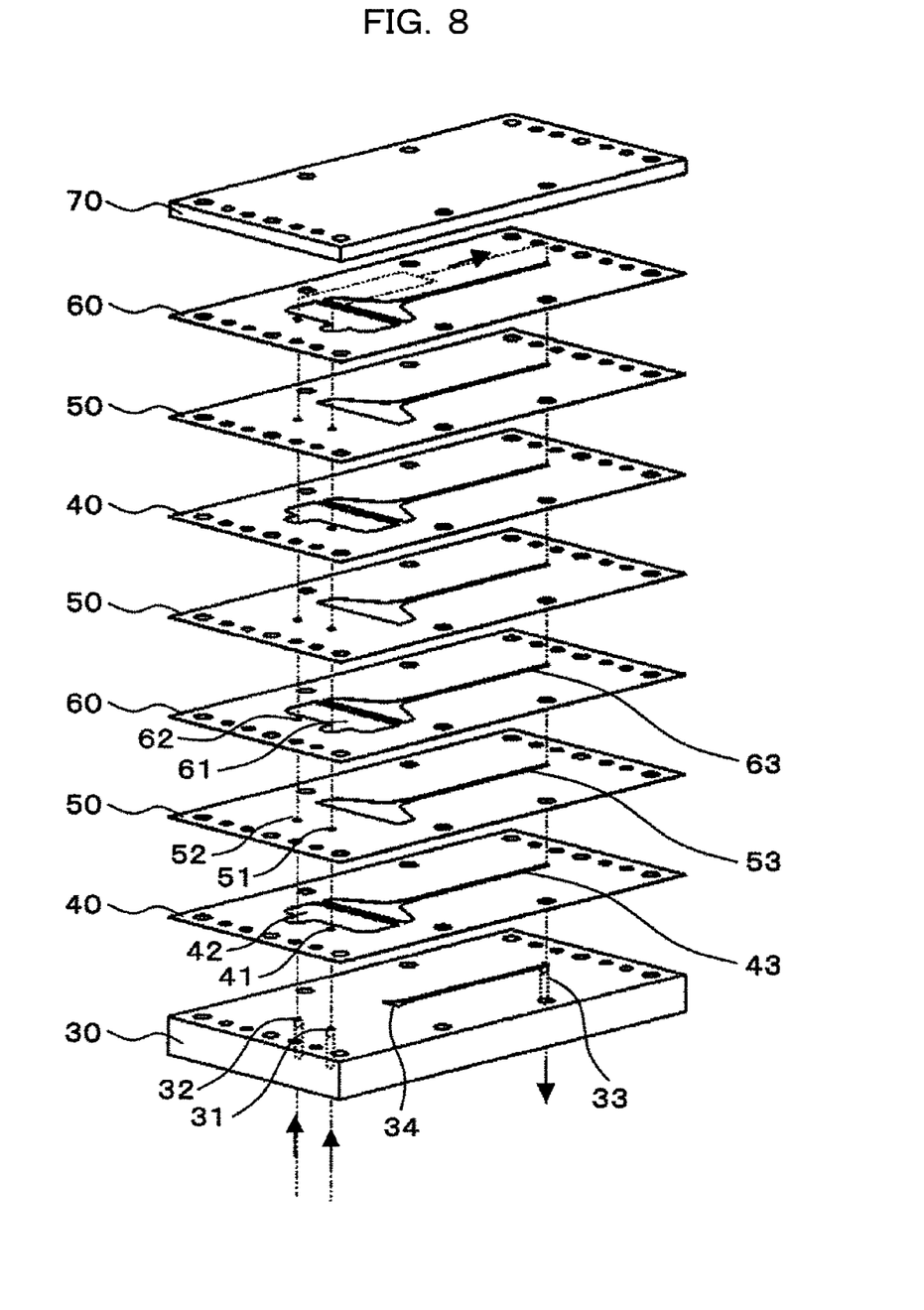
FIG. 8 is a perspective view showing a microreactor according to still another embodiment.
Figure 9:
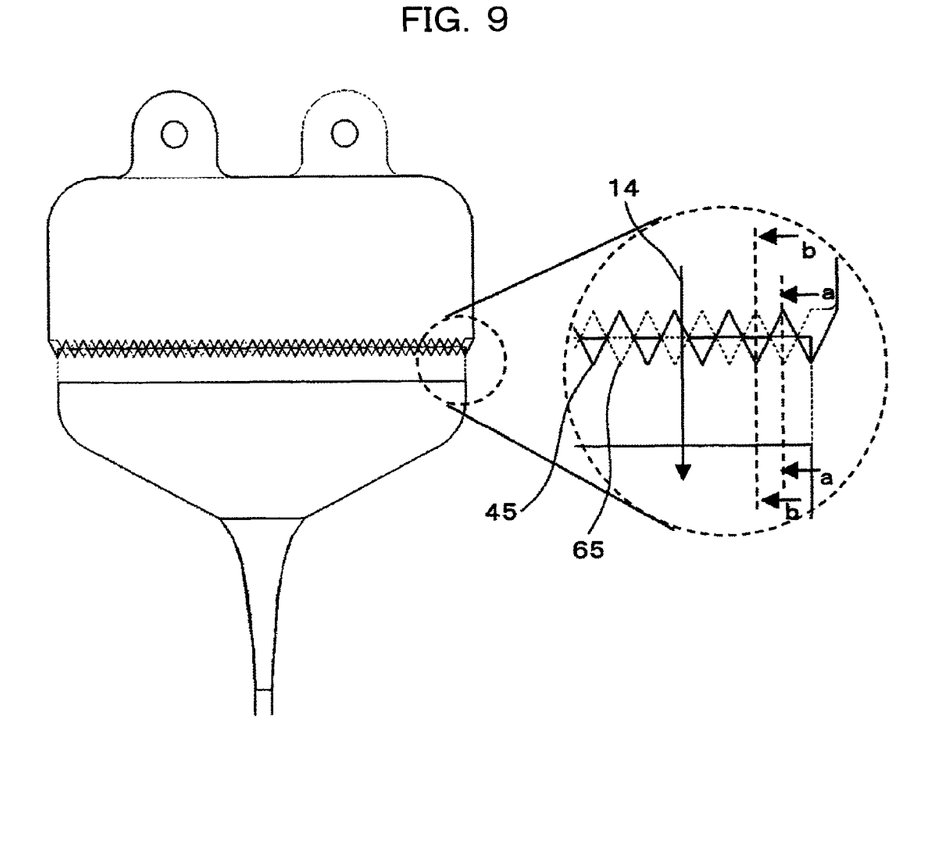
FIG. 9 is a partial plan view of the microreactor shown in FIG. 8
Figure 10:
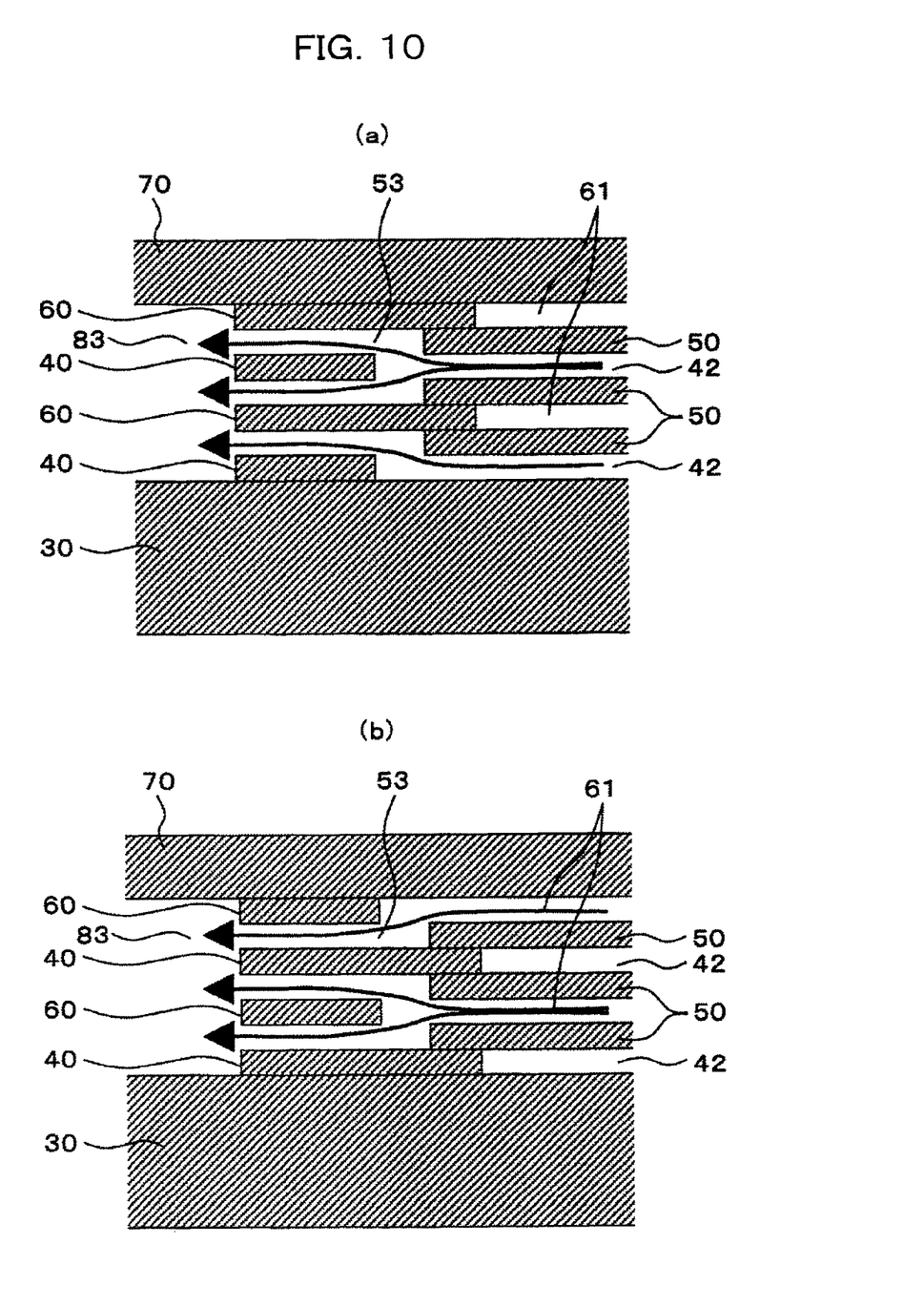
FIG. 10 is a cross-sectional view of the microreactor shown in FIG. 9.

FIG. 8 is an exploded perspective view showing a configuration of a microreactor according to still another embodiment. FIG. 9 is a partial plan view showing the configuration of the microreactor shown in FIG. 8, accompanied by a magnified view of a part of the configuration. FIGS. 10A and 10B are cross-sectional views of a section where raw material introducing fluid channels and mixing fluid channels each shown by the partial plan view of FIG. 8 overlap one another, the cross-sectional views obtained while viewed from a direction in which fluids flows. FIG. 10A is the cross-sectional view of the section taken along the line a-a of FIG. 9. FIG. 10B is the cross-sectional view of the section taken along the line b-b of FIG. 9.

Two sets each obtained by laminating a raw material introducing plate 40, a mixing fluid channel plate 50 and a raw material introducing plate 60 are superimposed one on another with another mixing fluid plate 50 interposed between each neighboring sets on a base plate 30 which is the lowermost part of the laminated structure. An upper lid 70 is superimposed on the top of the laminated structure.

Inlet orifices 31 and 32, a raw material liquid outlet orifice 33 and a mixing fluid channel 34 for raw material liquids are formed in the base plate 30. The mixing fluid channel 34 includes: a contraction section which contracts the flow in the width direction, and whose cross-section becomes larger as it goes downstream; and a mixing section in which the fluid channel cross-section of the fluid channel is unchanged.

An inlet orifice 41, a raw material introducing fluid channel 42 and a mixing fluid channel 43 for the raw material liquids are formed in the raw material introducing plate 40.

Inlet orifices 51 and 52, and a mixing fluid channel 53 for the raw material liquids are formed in the mixing fluid channel plate 50. A raw material introducing fluid channel 61 as well as an inlet orifice 62 and a mixing fluid channel 63 for the raw material liquids are formed in the raw material introducing plate 60.

Fluid channel convex portions 45 and 65 are formed respectively in the downstream ends of the raw material introducing fluid channels 42 and 61. In addition, each raw material introducing plate 40 and its neighboring raw material introducing plate 60 are formed in a way that the plates are laminated while shifting the apices of the fluid channel convex portion 45 from the apices of the fluid channel convex portion 65 by a half pitch in the width direction. Moreover, the raw material introducing fluid channels 40 and 60 are aligned to the mixing fluid channel 53 in the mixing fluid channel plate 50 in a way that the mixing fluid channel is interposed between the upper end and the lower end of each of the fluid channel convex portions.

Once two different fluids are introduced respectively to the raw material inlet orifices 31 and 32 in the base plate 30, a first one of the two fluids flows into the mixing fluid channel 53 in the mixing fluid channel plate 50 in a direction indicated by an arrow 14 in FIG. 9 via the fluid channel convex portion 45 in the raw material introducing channel 42, and a second one of the two fluids flows into the mixing fluid channel 53 in the mixing fluid channel 50 in the direction indicated by the arrow 14 in FIG. 9 via the fluid channel convex portion 65 in the raw material introducing channel 61.

In the cross-section a, the first fluid flows into the mixing fluid channel 53 from the raw material introducing channel 42, but no second fluid flows into the mixing fluid channel 53 from the raw material introducing fluid channel 61, as shown in FIG. 10A. On the other hand, in the cross-section b, the second fluid flows into the mixing fluid channel 53 from the raw material introducing fluid channel 61, but no first fluid flows into the mixing fluid channel 53 from the raw material introducing fluid channel 42, as shown in FIG. 10B. In this manner, the two fluids flow into the mixing fluid channel 33 alternately from the raw material introducing fluid channel 42 and 61 along the arrangement of the fluid channel convex portions 45 and 65 respectively at the ends of the raw material introducing fluid channels. Moreover, in a more downstream part, the mixing fluid channel 53 is combined with the mixing fluid channel 43 and 63, and thus into a mixing fluid channel 83. Thereby, in the mixing fluid channel 83, the two different fluids form a laminar flow in which the two fluids are arranged alternately in the width direction.

In the case where laminar flows are intended to be formed in the width direction by alternately introducing multiple different fluids to the mixing fluid channel from above and under via the respective raw material introducing channels, it is difficult to form laminar flows which are homogeneous in the depth direction if the width of each of the laminar flows becomes smaller than the depth of the mixing fluid channel. For this reason, the depth of an upstream part of the mixing fluid channels for forming laminar flows has to be designed to be smaller than the width of each of the laminar flows. This presents one of causes of making the pressure loss larger.

In the case of the present embodiment, mixing fluid channels each with a sufficiently small depth are laminated and combined together as they are in the section for forming laminar flows. This makes it possible for the microreactor to form stable laminar flows even though the laminar flows are large in the depth direction, and to reduce the pressure loss.

In addition, if a part (not illustrated) downstream of the mixing fluid channel 83 includes the mixing fluid channel's contraction flow section, the mixing fluid channel's contraction section and the mixing fluid channel's mixing section, this makes it possible for the microreactor to diffuse and mix fluids in a shorter period of time while holding the pressure loss to a lower level. Consequently, the microreactor according to the present invention is applicable to mixture of fluids each larger in amount and higher in viscosity.

What is claimed is:

1. A microreactor for mixing and discharging two raw material liquids, the microreactor obtained by laminating a base plate, a raw material introducing plate and a mixing fluid channel plate, the base plate having a first raw material introducing fluid channel formed therein for introducing one of the two raw material liquids, the raw material introducing plate having a second raw material introducing fluid channel formed therein for introducing the other of the two raw material liquids, the mixing fluid channel plate being arranged between the base plate and the raw material introducing plate, and the mixing fluid channel plate having a mixing fluid channel formed therein for mixing the two raw material liquids, the microreactor comprising:

a mixing fluid channel formed in the mixing fluid channel plate, such that in a downstream direction towards an outlet orifice, a cross-section of a portion of the mixing fluid channel becomes narrower in a width direction; and a mixing fluid channel formed in the base plate, such that in a downstream direction towards the outlet orifice, a cross-section of a portion of the mixing fluid channel becomes deeper in a depth direction;

wherein the mixing fluid channel in the base plate communicates with the mixing fluid channel in the mixing fluid channel plate, and is connected to the outlet orifice to discharge the mixed raw material liquids;

wherein each of the base plate and the raw material introducing plate include a plurality of alignment holes for setting a displacement amount forward or backward; and wherein a size of an opening through which one of the two raw material liquids flows from the first raw material introducing fluid channel into the mixing fluid channel in the mixing fluid channel plate, and a size of an opening through which the other of the two raw material liquids flows from the second raw material introducing fluid channel into the mixing fluid channel in the mixing fluid channel plate, are adjusted by selecting an alignment hole.

2. The microreactor as recited in claim 1, wherein the base plate includes a separate inlet orifice for each of the respective two raw material liquids, and the outlet orifice for mixed liquids.

3. The microreactor as recited in claim 2, wherein
the downstream end of each of the raw material introducing fluid channels has a triangular shape; and
the openings of the respective raw material introducing fluid channels to the mixing fluid channel are changed in size by changing a position in which the base plate and the raw material introducing plate are laminated.

4. The microreactor as recited in claim 2, wherein
the downstream end of each of the raw material introducing fluid channels has a semi-circular shape; and
the openings of the respective raw material introducing fluid channels to the mixing fluid channel are changed in size by changing a position in which the base plate and the raw material introducing plate are laminated.

5. The microreactor as recited in claim 1, wherein the downstream end of each of the raw material introducing fluid channels has a triangular shape; and
the openings of the respective raw material introducing fluid channels to the mixing fluid channel are changed in size by changing a position in which the base plate and the raw material introducing plate are laminated.

6. The microreactor as recited in claim 1, wherein
the down-stream end of each of the raw material introducing fluid channels has a semi-circular shape; and
the openings of the respective raw material introducing fluid channels to the mixing fluid channel are changed in size by changing a position in which the base plate and the raw material introducing plate are laminated.

7. The microreactor as recited in claim 1, wherein another portion of the mixing fluid channel in the base plate downstream in the depth direction has a substantially constant cross-sectional area.

8. The microreactor as recited in claim 1, further comprising an upper lid that covers the raw material introducing plate and the raw material introducing channel of the raw material introducing plate.

9. The microreactor as recited in claim 1, wherein in the downstream direction towards the outlet orifice, the cross-section of the portion of the mixing fluid channel in the base plate becomes both narrower in a width direction and deeper in a depth direction.

10. A microreactor for mixing and discharging two raw material liquids, the microreactor comprising:
a base plate, including a mixing fluid channel formed in the base plate such that in a downstream direction towards an outlet orifice, a cross-section of a portion of the mixing fluid channel becomes at least one of narrower in a width direction and deeper in a depth direction;
a raw material introducing plate; and
a mixing fluid channel plate, including a mixing fluid channel formed in the mixing fluid channel plate such that in a downstream direction towards the outlet orifice, a cross-section of a portion of the mixing fluid channel becomes narrower in a width direction;
wherein the base plate, the raw material introducing plate, and the mixing fluid channel plate are laminated together;
wherein the base plate has formed therein a first raw material introducing fluid channel for introducing one of the two raw material liquids;
wherein the raw material introducing plate has formed therein a second raw material introducing fluid channel for introducing the other of the two raw material liquids;
wherein the mixing fluid channel plate is arranged between the base plate and the raw material introducing plate, and the mixing fluid channel plate has formed therein a mixing fluid channel for mixing the two raw material liquids;
wherein the mixing fluid channel in the base plate communicates with the mixing fluid channel in the mixing fluid channel plate, and is connected to the outlet orifice from which to discharge the mixed raw material liquids;
wherein each of the base plate and the raw material introducing plate include a plurality of alignment holes for setting a displacement amount forward or backward; and
wherein a size of an opening through which one of the two raw material liquids flows from the first raw material introducing fluid channel into the mixing fluid channel in the mixing fluid channel plate, and wherein a size of an opening through which the other of the two raw material liquids flows from the second raw material introducing fluid channel into the mixing fluid channel in the mixing fluid channel plate are adjusted by selecting an alignment hole.

11. The microreactor as recited in claim 10, wherein another portion of the mixing fluid channel in the base plate further downstream in the downstream direction towards the outlet orifice has a substantially constant a cross-sectional area.

12. The microreactor as recited in claim 10, further comprising an upper lid that covers the raw material introducing plate and the raw material introducing channel of the raw material introducing plate.

13. The microreactor as recited in claim 10, wherein in the downstream direction towards the outlet orifice, the cross-section of the portion of the mixing fluid channel in the base plate becomes both narrower in a width direction and deeper in a depth direction.

14. A microreactor for mixing and discharging two raw material liquids, the microreactor comprising:
a base plate, including a mixing fluid channel formed therein such that in a downstream direction towards an outlet orifice, a cross-section of a portion of the mixing fluid channel becomes at least one of narrower in a width direction and deeper in a depth direction, and including a first raw material introducing fluid channel for introducing one of the two raw material liquids into the mixing fluid channel;
a raw material introducing plate, including a second raw material introducing fluid channel formed therein for introducing the other of the two raw material liquids into the mixing fluid channel; and
a mixing fluid channel plate, including a mixing fluid channel that is formed therein for the purpose of mixing the two raw material liquids, such that in a downstream direction towards the outlet orifice, a cross-section of a portion of the mixing fluid channel becomes narrower in a width direction;
wherein the base plate, the raw material introducing plate, and the mixing fluid channel plate are laminated together such that the mixing fluid channel plate is arranged between the base plate and the raw material introducing plate;
wherein the mixing fluid channel in the base plate communicates with the mixing fluid channel in the mixing fluid channel plate, and is connected to the outlet orifice from which to discharge the mixed raw material liquids;

wherein each of the base plate and the raw material introducing plate include a plurality of alignment holes for setting a displacement amount forward or backward; and wherein a size of an opening through which one of the two raw material liquids flows from the first raw material introducing fluid channel into the mixing fluid channel in the mixing fluid channel plate, and wherein a size of an opening through which the other of the two raw material liquids flows from the second raw material introducing fluid channel into the mixing fluid channel in the mixing fluid channel plate are adjusted by selecting an alignment hole.

15. The microreactor as recited in claim 14, wherein another portion of the mixing fluid channel in the base plate that is downstream in the downstream direction towards the outlet orifice has a substantially constant a cross-sectional area.

16. The microreactor as recited in claim 14, further comprising an upper lid that covers the raw material introducing plate and the raw material introducing channel of the raw material introducing plate.

17. The microreactor as recited in claim 14, wherein downstream in the downstream direction towards the outlet orifice, the cross-section of the portion of the mixing fluid channel in the base plate becomes both narrower in a width direction and deeper in a depth direction.

* * * * *